United States Patent
Yamamoto et al.

(10) Patent No.: US 7,237,371 B2
(45) Date of Patent: Jul. 3, 2007

(54) DEEP DRAW PACKING METHOD AND FILM WITH SMALL SHRINKABILITY FOR DEEP DRAW PACKING

(75) Inventors: Masataka Yamamoto, Tokyo (JP); Takeo Omori, Ibaraki (JP)

(73) Assignee: Kureha Chemical Industry Company, Limited, Tokyo (JP)

( * ) Notice: Subject to any disclaimer, the term of this patent is extended or adjusted under 35 U.S.C. 154(b) by 55 days.

(21) Appl. No.: 10/529,236

(22) PCT Filed: Sep. 22, 2003

(86) PCT No.: PCT/JP03/12104

§ 371 (c)(1),
(2), (4) Date: Mar. 25, 2005

(87) PCT Pub. No.: WO2004/028920

PCT Pub. Date: Apr. 8, 2004

(65) Prior Publication Data
US 2006/0254218 A1    Nov. 16, 2006

(30) Foreign Application Priority Data
Sep. 26, 2002   (JP)   ............................. 2002-282050

(51) Int. Cl.
B65B 31/00    (2006.01)
B65B 47/02    (2006.01)
B65B 25/06    (2006.01)
B32B 27/34    (2006.01)

(52) U.S. Cl. ..................... 53/433; 53/442; 53/453; 53/511; 53/557; 53/561; 53/478; 53/329.3

(58) Field of Classification Search ............... 53/432, 53/433, 442, 471, 478, 140, 141, 510, 511, 53/557, 281, 282, 329.3
See application file for complete search history.

(56) References Cited

U.S. PATENT DOCUMENTS 3,347,011 A * 10/1967 Lovas et al. .................. 53/433

(Continued)

FOREIGN PATENT DOCUMENTS

GB    2 119 341 A    11/1983

(Continued)

OTHER PUBLICATIONS

International Search Report.

(Continued)

*Primary Examiner*—Stephen F. Gerrity
(74) *Attorney, Agent, or Firm*—Nixon & Vanderhye, PC (57) ABSTRACT

Deep draw packaging includes placing an object (C) in a concave container portion (1) formed by molding a film with small shrinkability (A), that is a film having a residual thermal shrinkage rate at 100° C. of 1 to 15 %. The film (A) is formed by stretching a film having deep draw moldability and then thermally relaxing the film. The film has a surface which is formed of a heat sealable material which becomes the inner wall of the container portion. The concave container portion (1) is thereafter transferred to to a vacuum packaging apparatus (5) where it is covered by a cover portion (2) formed of a film (B) which can be heat welded to the film (A). A side face portion (11) and a bottom face portion (12) of the concave container portion (1) are thermally shrunk into close contact with the object (C). Less curling is exhibited when an upper peripheral portion (13) of the concave container portion (1) is sealed with the film (B).

11 Claims, 4 Drawing Sheets

U.S. PATENT DOCUMENTS

| | | | |
|---|---|---|---|
| 3,956,867 A | | 5/1976 | Utz et al. |
| 4,642,239 A | | 2/1987 | Ferrar et al. |
| 5,270,390 A | * | 12/1993 | Shibuya et al. ............. 525/173 |
| 5,290,635 A | * | 3/1994 | Matsumura et al. ........ 428/516 |
| 5,344,715 A | * | 9/1994 | Negi et al. .................. 428/520 |
| 5,851,610 A | * | 12/1998 | Ristey et al. ............... 428/34.9 |
| 6,428,884 B1 | * | 8/2002 | Naoe et al. .................. 428/323 |
| 6,739,113 B1 | * | 5/2004 | Kocher et al. ................. 53/442 |
| 6,777,046 B1 | * | 8/2004 | Tatarka et al. ............. 428/34.9 |

FOREIGN PATENT DOCUMENTS

| | | | |
|---|---|---|---|
| JP | 61 6787 | | 2/1986 |
| JP | 61-6787 B2 | * | 2/1986 |
| JP | 8-198208 | | 8/1996 |
| JP | 2000-37828 | | 2/2000 |
| JP | 2000-37828 A | * | 2/2000 |
| JP | 2001-71435 | | 3/2001 |
| JP | 2001-71435 A | * | 3/2001 |
| JP | 2002-3620 | | 1/2002 |
| WO | WO 200198081 A2 | * | 12/2001 |

OTHER PUBLICATIONS

Patent Abstract of Japan, Publication No. 2002172746, dated Jun. 18, 2002.

Patent Abstract of Japan, Publication No. 57159622, dated Oct. 1, 1982.

Patent Abstract of Japan, Publication No. 2001071435, dated Mar. 21, 2001.

Patent Abstract of Japan, Publication No. 08230035, dated Sep. 10, 1996.

Patent Abstract of Japan, Publication No. 08001878, dated Jan. 9, 1996.

Patent Abstract of Japan, Publication No. 01196338, dated Aug. 8, 1989.

Supplementary European Search Report.

* cited by examiner

→ 14 Frame seal portion
→ 14' Face seal portion

DEEP DRAW PACKING METHOD AND FILM WITH SMALL SHRINKABILITY FOR DEEP DRAW PACKING

This application is the US national phase of international application PCT/JP2003/012104 filed 22 Sep. 2003 which designated the U.S. and claims benefit of JP 2002-282050, dated 26 Sep. 2002, the entire content of which is hereby incorporated by reference.

TECHNICAL FIELD

The present invention relates to a deep draw packaging method in which an object to be packaged (hereinafter may be referred to simply as an "object") (e.g., a processed food) is placed in a concave container portion formed through molding of a specific film exhibiting small shrinkability (hereinafter may be referred to as a "film with small shrinkability"); a top film is placed on the container portion; the resultant product is transferred to a specific vacuum packaging apparatus; side and bottom portions of the concave container portion are thermally shrunk so as to bring the container portion into close contact with the object without formation of wrinkles on the portion or vacant gaps between the portion and the object; and the container portion is thermally sealed with the top film, to thereby produce a packaged product having few curled portions.

BACKGROUND ART

Vacuum packaging (generally deep draw packaging or skin packaging) is employed for packaging of objects (in particular, processed foods such as processed meat products and fish-based paste products).

In the case of deep draw packaging, generally, a belt-shaped film is continuously fed to a cooling mold having a plurality of concave portions; the film is heated, and then pressed onto the mold under vacuum and/or pressurized conditions, thereby forming a plurality of concave containers through deep drawing; an object (e.g., sliced ham) is placed in each of the containers; a film for a top film is continuously fed to cover the containers; and air is evacuated from the containers, followed by thermal sealing of the upper peripheral portion of each of the containers with the top film, to thereby produce a plurality of vacuum-packaged products in a continuous manner.

However, deep draw packaging involves problems in that, for example, wrinkles are formed at a portion at which a top film or an object (e.g., roast pork) placed in a concave container comes into close contact with the side(s) or bottom of the concave container, vacant gaps are formed at the contact portion and meat juice or drip enters the vacant gaps, or pinholes tend to be generated at the thus-formed wrinkles or vacant gaps. This occurs because a variation in the size of the object as measured in a horizontal direction is greater than a variation in the size thereof as measured in a vertical direction. Therefore, a mold employed in deep draw packaging is generally required to have a size and a shape which fit those of an object to be packaged.

In food processing manufacturers, in pursuit of high production efficiency, a variety of objects have been vacuum-packaged through deep draw packaging by use of a general-purpose mold (without exchange of the mold). However, there have arisen more and more quality-related problems caused by the aforementioned wrinkles, vacant gaps, or pinholes.

In view of the foregoing, there has been disclosed a method in which an object is vacuum-packaged with a conventional multi-layer film for deep draw packaging, and high-temperature steam is sprayed onto the resultant packaged product for thermal shrinkage of the film, to thereby smooth out wrinkles from being formed on the packaged product. However, this method involves problems in that wrinkles may be newly formed at a portion of the packaged product that has no wrinkles, as well as at a portion thereof that has wrinkles, and that the contents of the packaged product may collapse as a result of shrinkage of the entirety of the film.

The aforementioned method employing steam spraying, or a method in which a packaged product is boiled so as to thermally treat the contents of the product and to smooth out wrinkles (see claim 1 and sections 0024 and 0025 of Japanese Patent Application Laid-Open (kokai) No. 8-198208) involves problems in terms of moisture remaining in the packaged product or removal of the moisture.

Meanwhile, there has been disclosed an apparatus for smoothing out wrinkles on a deep draw vacuum-packaged product, which apparatus includes a hot air generation/spraying unit for spraying hot air having a temperature equal to or higher than the molding temperature onto only wrinkles formed on the surface of a film serving as a bottom film for the container portion of a vacuum-packaged product (hereinafter such a film may be referred to as a "container material film"); a unit for cooling the container material film for preventing the effect of hot air on a portion of the film that has no wrinkles; a flange portion cooling unit for preventing the effect of hot air on a flange portion of the packaged product; and a hot air jet shielding unit for preventing the effect of hot air on other units and on packaged products adjacent to the target vacuum-packaged product (see claim 1 of Japanese Patent Application Laid-Open (kokai) No. 4-31218).

However, in the case of this technique, when an object to be packaged has a shape and a size which considerably differ from those of a mold, a portion of a packaging film that undergoes shrinkage may vary depending on the type of the unit to be employed, or the film may fail to be shrunk sufficiently, and therefore, wrinkles cannot be smoothed out completely. In the case where a shrinkable film is employed, a peripheral seal portion (non-molded portion) of the container portion of a packaged product also undergoes shrinkage, and thus the seal portion is curled attributed to the difference in percent shrinkage between the seal portion and a top film, leading to poor appearance of the product.

Such a container material film employed for deep draw packaging is required to have, for example, deep draw moldability, heat resistance, pinhole resistance, labelability, and sealability to a top film. In addition, the film is required to have gloss, transparency, sealing strength, and ability to prevent removal of a label therefrom. In accordance with the type of an object to be packaged, the film may be required to have easy peelability to a top film. In order to satisfy such requirements, a variety of packaging materials have been proposed.

For example, there has been disclosed a co-extruded composite film for deep draw molding, the film including a polybutylene terephthalate resin layer serving as the outermost layer, a sealable resin layer serving as the innermost layer, and a gas-barrier resin (e.g., polyamide resin) layer serving as an intermediate layer (see claim 1 of Japanese Patent Application Laid-Open (kokai) No. 6-226930).

Also, there has been disclosed a method employing, as a container material film, a stretch-oriented multi-layer film which includes a surface layer formed of a thermoplastic resin, an intermediate layer formed of a polyamide resin, and a surface layer formed of a sealable resin, and which has an impact energy (on the basis of a 50 μm thickness) of 1.5 J or more as measured at −10° C., wherein a packaged product is produced under vacuum by use of a conventional deep draw packaging apparatus, and then the product is subjected to shrinkage with hot water (e.g., boiling) for smoothing out wrinkles thereon (see claim 1 of International Patent Publication WO 01/98081).

Meanwhile, skin packaging is advantageous in that a film for packaging can be brought into close contact with an object to be packaged, and thus no wrinkles are formed on the resultant packaged product; i.e., the packaged product exhibits good appearance. In a fundamental technique of skin packaging, an object to be packaged is placed on a base film, a heat-softened film for skin packaging is covered over the object, and air is evacuated from the resultant product, to thereby bring the skin-packaging film into close contact with the object.

There has been disclosed a skin packaging method in which an object is packaged, by use of a skin packaging apparatus, with a skin-packaging film which includes at least two layers: a sealable resin layer (a) constituting the side of the film opposite the side which faces a mold, and a stretched polyamide resin layer (b) formed of a polyamide resin having a melting point higher, by about 15° C. or more, than the heating temperature of the film, and which exhibits, at the film heating temperature, a thermal shrinkage stress of 200 g/15-mm width or less and a percent thermal shrinkage of 3% or more as measured in at least one direction (see claims 1 through 7 of Japanese Patent Application Laid-Open (kokai) No. 2001-71435).

This publication describes that the packaging method can produce a wrinkle-free skin-packaged product. However, this method fails to solve economical problems caused by low molding speed (i.e., a disadvantage derived from skin packaging).

DISCLOSURE OF THE INVENTION

Objects of the present invention are to provide a deep draw packaging method in which an object is brought into close contact with a packaging film without formation of wrinkles on the film or vacant gaps between the object and the film, so as to produce a packaged product having few curled portions on a sealed portion; and to provide a film with small shrinkability for deep draw packaging, which film is employed in the deep draw packaging method.

The present inventors have found that when an object is placed in a concave container portion formed through molding of a specific film with small shrinkability, a film for a top film is covered over the container portion, and, by use of a specific vacuum packaging apparatus, side face and bottom face portions of the concave container portion are thermally shrunk and the container portion is thermally sealed with the top film film, the film can be brought into close contact with the container object without formation of wrinkles on the portion or vacant gaps between the portion and the object, and the object can be packaged with the container portion such that formation of wrinkles or curled portions on the sealed portion is suppressed. The present invention has been accomplished on the basis of this finding.

Accordingly, a first invention provides a deep draw packaging method comprising placing an object (C) in a concave container portion (1) formed through molding of a film with small shrinkability (A) having a residual heat shrinkage rate at 100° C. of more than 0 and 15% or less, the film (A) being formed by stretching a film having deep draw moldability and then thermally relaxing the film, the film having a surface which is formed of a heat sealable material and to become the inner wall of the container portion; transferring the concave container portion (1) to a vacuum packaging apparatus (5); placing, on the concave container portion (1), a cover section (2) formed of a film (B) which can be heat welded to the film with small shrinkability (A); thermally shrinking a side face portion (11) and a bottom face portion (12) of the concave container portion (1) by use of a concave portion heating/shrinking mold (6) such that the side face portion (11) and the bottom face portion (12) come into close contact with the object (C); and sealing an upper peripheral portion (13) of the concave container portion (1) with the film (B) through heating/sealing means (7).

A second invention provides a deep draw packaging method according to the first invention, wherein the film with small shrinkability (A) is formed by stretching a film having deep draw moldability at 80 to 95° C. with extension ratio of 2.5 to 4.0 times in a machine direction (MD) and with extension ratio of 2.5 to 4.0 times in a transverse direction (TD), and then shrinking the film at 70 to 98° C. by 10 to 40% in the MD and by 10 to 40% in the TD.

A third invention provides a deep draw packaging method according to the first invention, wherein the film with small shrinkability (A) includes a sealable resin layer (a); a polyamide resin layer (b) which is formed of a polyamide resin having a melting point higher by about 15° C. or more than the temperature for heating the film constituting the concave container portion (1) and which has been stretched and then thermally relaxed; and, if desired, a surface layer (c) formed of a thermoplastic resin.

A fourth invention provides a deep draw packaging method according to the second invention, wherein the film with small shrinkability (A) includes a sealable resin layer (a); a polyamide resin layer (b) which is formed of a polyamide resin having a melting point higher by about 15° C. or more than the temperature for heating the film constituting the concave container portion (1) and which has been stretched and then thermally relaxed; and, if desired, a surface layer (c) formed of a thermoplastic resin.

A fifth invention provides a deep draw packaging method according to any of the first through fourth inventions, wherein the object (C) is a processed food.

A sixth invention provides a deep draw packaging method according to any of the first through fourth inventions, wherein the film (B) is the film with small shrinkability (A).

A seventh invention provides a deep draw packaging method according to the fifth invention, wherein the film (B) is the film with small shrinkability (A).

An eighth invention provides a deep draw packaging method according to any of the first through fourth inventions, wherein the vacuum packaging apparatus (5) can heat the side face portion (11) and the bottom face portion (12) of the transferred concave container portion (1) to 70 to 120° C., and can evacuate the space between the concave container portion (1) containing the object (C) and the cover portion (2) formed of the film (B).

A ninth invention provides a deep draw packaging method according to the fifth invention, wherein the vacuum packaging apparatus (5) can heat the side face portion (11) and the bottom face portion (12) of the transferred concave container portion (1) to 70 to 120° C., and can evacuate the space between the concave container portion (1) containing the object (C) and the cover portion (2) formed of the film (B).

A tenth invention provides a deep draw packaging method according to the eighth invention, wherein the vacuum packaging apparatus (5) has a structure such that the concave portion heating/shrinking mold (6) comes into close contact with the side face portion (11) and the bottom face portion (12) of the concave container portion (1) after initiation of evacuation.

An eleventh invention provides a deep draw packaging method according to the ninth invention, wherein the vacuum packaging apparatus (5) has a structure such that the concave portion heating/shrinking mold (6) comes into close contact with the side face portion (11) and the bottom face portion (12) of the concave container portion (1) after initiation of evacuation.

A twelfth invention provides a film with small shrinkability for deep draw packaging, which film has a residual heat shrinkage rate at 100° C. of more than 0 and 15% or less, and is formed by stretching and then thermally relaxing a film having a surface which is formed of a heat sealable material and to become the inner wall of a container.

A thirteenth invention provides a film with small shrinkability for deep draw packaging according to the twelfth invention, which film includes a sealable resin layer (a); a polyamide resin layer (b) which is formed of a polyamide resin having a melting point higher by about 15° C. or more than the temperature for heating the film and which has been stretched and then thermally relaxed; and, if desired, a surface layer (c) formed of a thermoplastic resin.

BRIEF DESCRIPTION OF THE DRAWINGS

FIGS. 3A-3C schematically show an embodiment of the deep draw packaging method of the present invention, wherein

DESCRIPTION OF REFERENCE NUMERALS

1. Concave container portion
2. Cover portion
3. Concave mold
4. Conventional vacuum packaging apparatus
5. Vacuum packaging apparatus employed in the present invention
6. Concave portion heating/shrinking mold
6'. Heating means
7. Heating/sealing means
8. Heating plate
9. Concave portion forming mold
10. Packaged product
11. Side face portion
12. Bottom face portion
13. Upper peripheral portion
14. Frame seal portion
14'. Face seal portion
15. Wrinkle
16. Vacant gap
21. Top-side outlet
22. Middle-side outlet
23. Bottom-side outlet
A. Film with small shrinkability
B. Film (for top film)
C. Object to be packaged
f. Non-shrinkable film

BEST MODE FOR CARRYING OUT THE INVENTION

Next will be described the difference between the deep draw packaging method of the present invention and a conventional deep draw packaging method with reference to drawings.

Deep Draw Packaging Method

Figure 1:
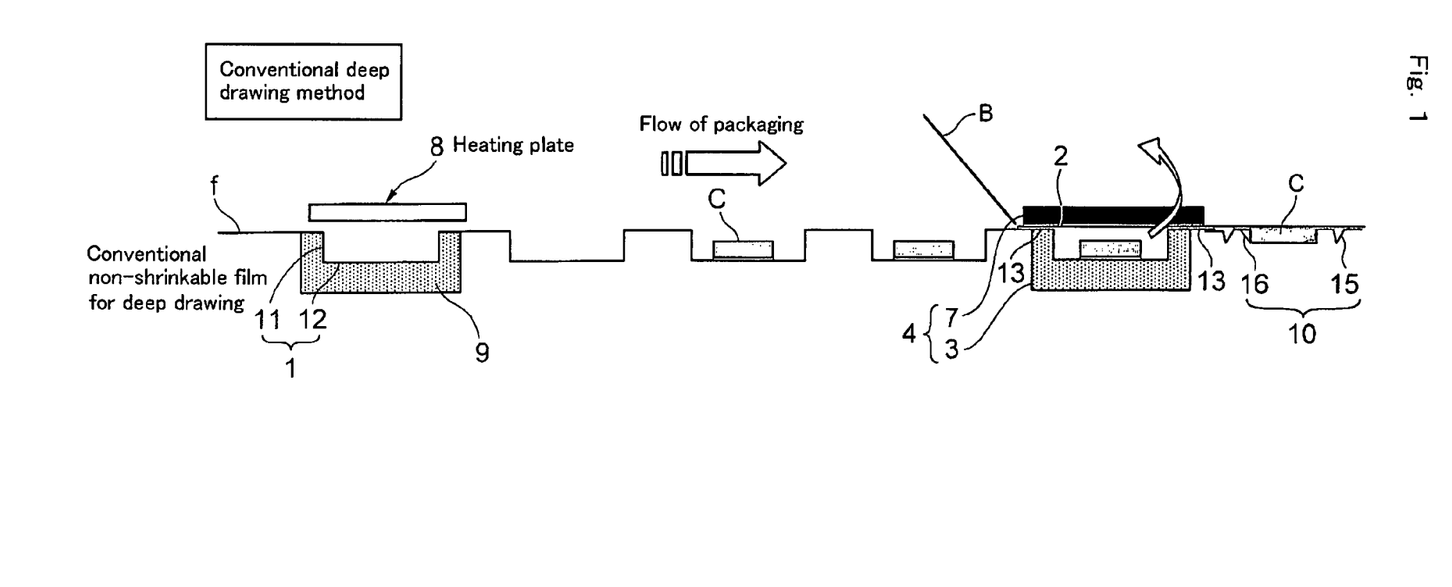
FIG. 1 is a schematic representation illustrating a conventional deep draw packaging method.

FIG. 1 is a schematic representation illustrating a conventional deep draw packaging method.

A continuously fed non-shrinkable film f is heat-softened by use of a heating plate 8, and is pressed onto a concave portion forming mold 9 by means of, for example, vacuum forming, pressure forming, vacuum/pressure forming, or plug-assist forming, followed by cooling, whereby a concave container portion 1 is formed. The periphery of the concave container portion 1, which remains flat, provides an upper peripheral portion 13.

After an object C is placed in the concave container portion 1, a film B is continuously fed so as to form a cover portion 2 on the portion 1, and the resultant product is transferred to a vacuum packaging apparatus 4. In the vacuum packaging apparatus 4, air is evacuated from the space between the concave container portion 1 and the cover portion 2, forming a vacuum, and subsequently the upper peripheral portion 13 of the concave container portion 1 is sealed with the cover portion 2 through heat welding by use of a concave mold 3 and heating means 7 such as a heat press plate 7' (not illustrated), and if desired, a portion which extends outside the sealed portion is removed through cutting, to thereby yield a packaged product. In the sealed portion, a portion formed by sealing of the upper peripheral portion 13 with the cover portion 2 through heat welding will be referred to as a "frame seal portion" 14, and a portion formed by sealing of a side face portion 11 and a bottom face portion 12 (i.e., portions surrounding the object C) with the cover portion 2 through heat welding under vacuum will be referred to as a "face seal portion" 14'.

However, in the resultant packaged product, close contact fails to be achieved completely between the shrunk concave container portion 1, the object C, and the cover portion 2, and numerous wrinkles 15 are formed on the concave container portion 1.

Figure 2:
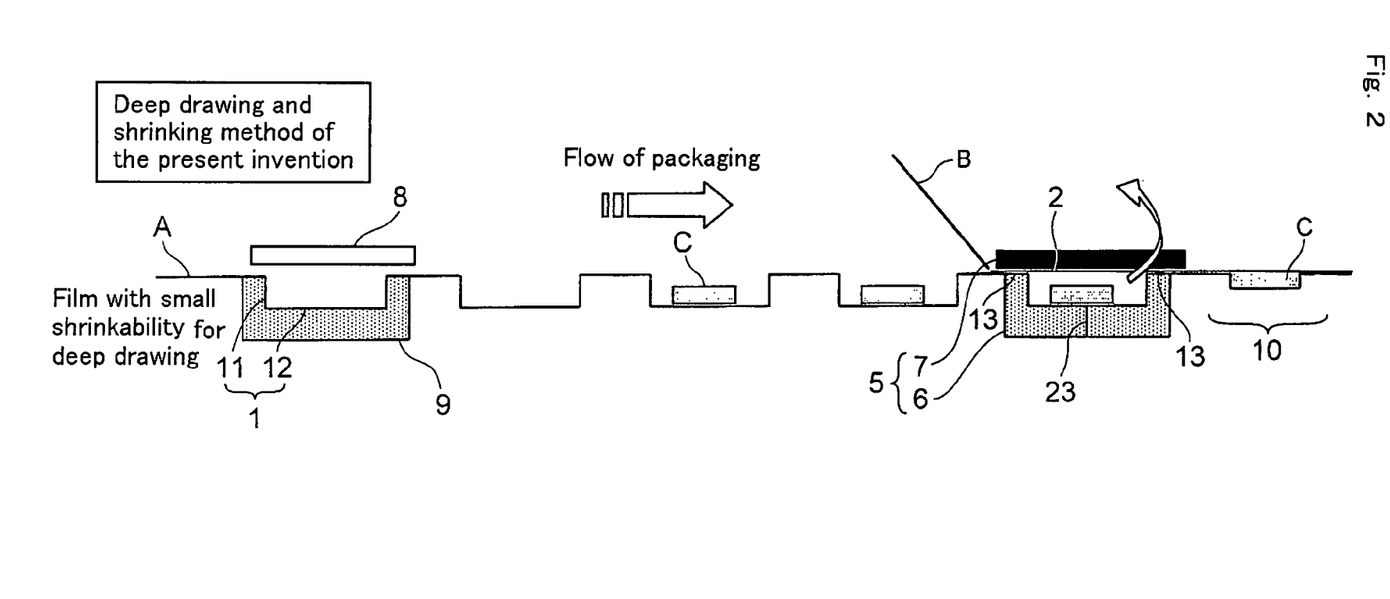
FIG. 2 is a schematic representation illustrating an embodiment of the deep draw packaging method of the present invention.
Figure 3A:
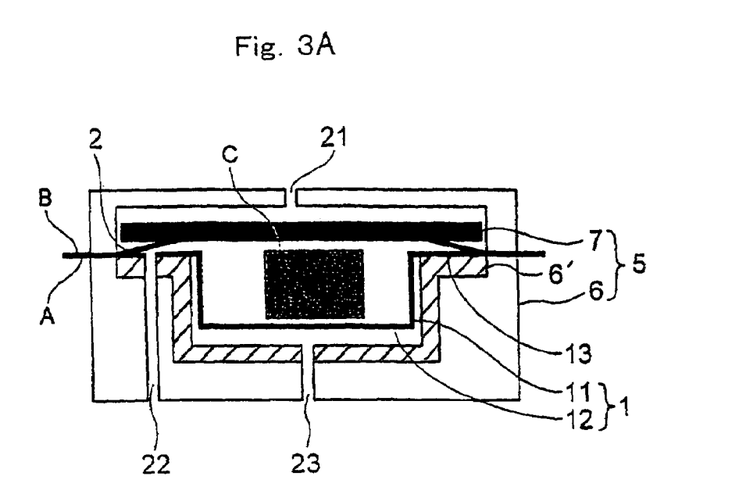
FIG. 3A is a vertical cross-sectional view of a vacuum packaging apparatus.

FIG. 2 is a schematic representation illustrating an embodiment of the deep draw packaging method of the present invention. FIG. 3A schematically shows in vertical cross-section a vacuum packaging apparatus 5, which is an example of the vacuum packaging apparatus employed in the present invention.

Figure 3B:
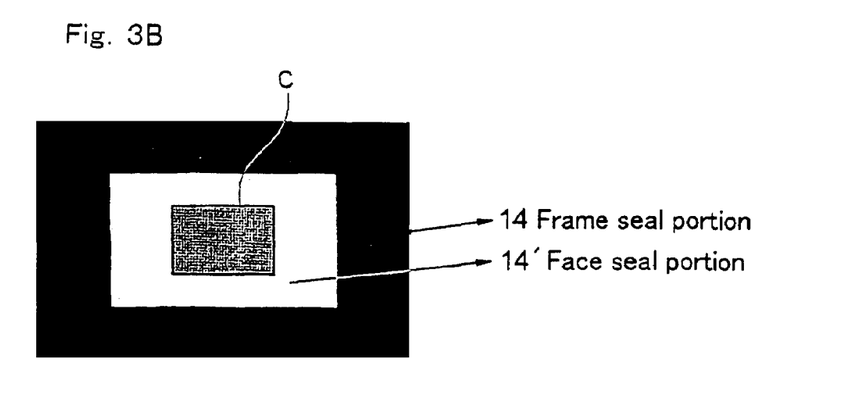
FIG. 3B is a top view of a packaged product produced through the method.

The procedure of the aforementioned conventional deep draw packaging method is repeated, except that a specific film with small shrinkability A is continuously fed in place of the non-shrinkable film f, to thereby form a concave container portion 1 and an upper peripheral portion 13. As shown in FIGS. 3A-3B, after an object C is placed in the concave container portion 1, a film B is continuously fed so as to form a cover portion 2 on the portion 1, and the resultant product is transferred to a vacuum packaging apparatus 5.

The vacuum packaging apparatus 5 has a box structure such that air can be evacuated through a top-side outlet 21 from the space which is present above the film B for the cover portion, through a bottom-side outlet 23 from the space which extends over the outer bottom of the concave container portion 1, and through a middle-side outlet 22 from the space between the cover portion and the inside of the concave container portion 1 containing the object.

In the vacuum packaging apparatus 5, the concave container portion 1 is heated in a concave portion heating/shrinking mold 6 by means of heating means 6' (e.g., a heating plate), steam, or hot water, whereby the portion 1 is shrunk so as to fit the shape of the object C; and air is evacuated through the middle-side outlet 22 from the space between the concave container portion 1 and the cover portion 2, followed by heat welding to seal the upper peripheral portion of the container portion with the cover portion, to thereby yield a packaged product in a manner similar to that of the aforementioned conventional deep draw packaging method.

No particular limitations are imposed on the sequence of the aforementioned heating/shrinking operation and evacuation operation. Preferably, the heating/shrinking operation and evacuation operation are carried out simultaneously in order to attain air-tight packaging of the object C. In practice, since air is evacuated from the space outside the concave container portion before air is evacuated from the space inside the portion, the concave container portion (i.e., the molded portion) swells, and the entirety of the portion comes into contact with the heating means 6' of the concave portion heating/shrinking mold 6, whereby the container portion is heated. Subsequently, while air is evacuated from the space containing the object C, sealing of the upper peripheral portion 13 (i.e., the non-formed portion) is performed.

Figure 3C:
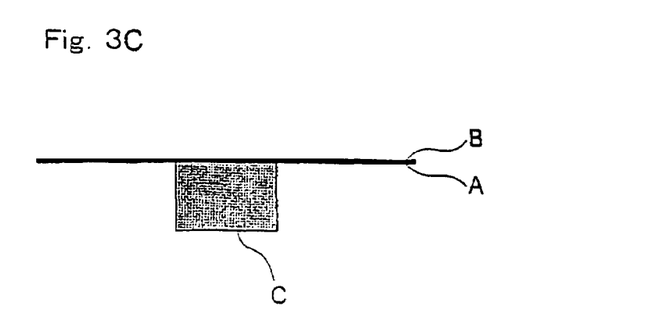
FIG. 3C is a vertical cross-sectional view of the packaged product.
Figure 4:
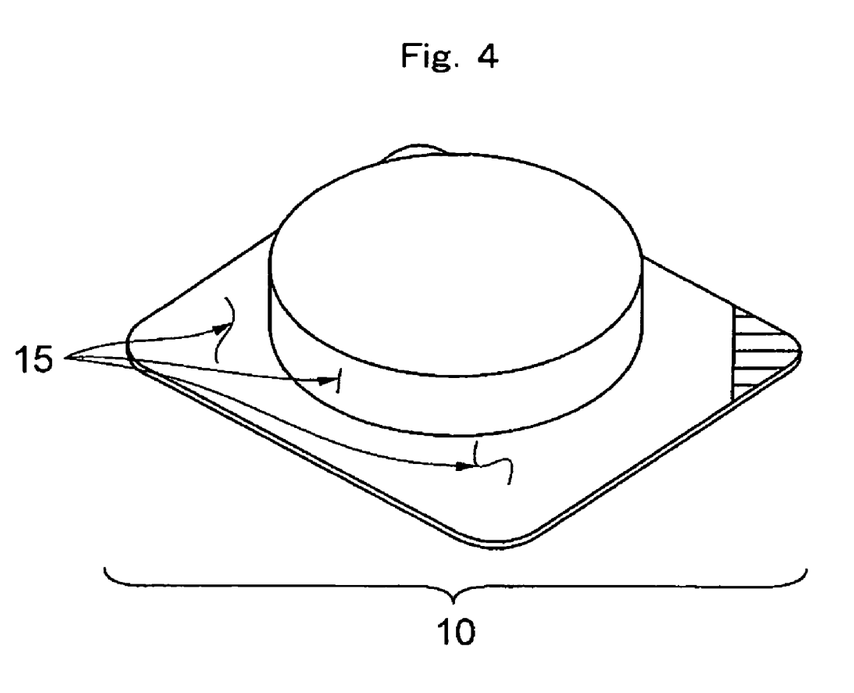
FIG. 4 is a perspective view showing a packaged product produced through a conventional deep draw packaging method.

Thereafter, the vacuum on the bottom side of the concave container portion (bottom vacuum) is released by means of the bottom-side outlet 23 before the vacuum above the top film (top vacuum) is released, to thereby bring the cover material B into contact with a side face portion 11 and a bottom face portion 12 (i.e., portions surrounding the object C) of the concave container portion. Subsequently, the resultant contact surface is pressed onto a heat press plate 7' (not illustrated) for sealing, whereby a face seal portion 14' is formed.

The resultant packaged product has almost no wrinkles and vacant gaps between the shrunk concave container portion 1, the object C, and the cover portion 2.

No particular limitations are imposed on the concave portion heating/shrinking mold 6 according to the present invention, so long as it provides a necessary amount of heat for heating and shrinking the side face portion 11 and the bottom face portion 12 of the concave container portion 1 containing the object C. Preferably, the concave portion heating/shrinking mold 6 has a shape such that a good contact is established between the inner wall of the mold 6 and the non-shrunk concave container portion 1; i.e., the size of the mold 6 is equal to or greater (by about 5% or less) than that of the container portion 1.

No particular limitations are imposed on the method for heating the concave portion heating/shrinking mold 6, and the heating method may be a method employing, for example, a heater, a heating medium, a heating plate which can be heated by infrared radiation, etc., or electromagnetic induction heating of a surface metal.

The method for heating the concave container portion 1 may be a method employing surface contact between the portion 1 and the above-heated concave portion heating/shrinking mold 6.

In the case where the concave container portion 1 is to be heated by means of the concave portion heating/shrinking mold 6, even when the surface of the mold 6 that is in contact with the portion 1 is not heated, the portion 1 may be heated or pressurized by means of feeding of a heating fluid (e.g., heating air or water vapor) through the outlet 26.

When the temperature of the object C is low, the amount of heat required for heating and shrinking the concave container portion 1, the heating time, the cooling time, etc. are determined in consideration of the film material and the effects of the object C on the portion 1. For example, conceivably, the concave container portion 1 begins to shrink immediately after being brought into contact with the concave portion heating/shrinking mold 6, and the portion 1 is raised by means of the upper peripheral portion 13 formed of the film with small shrinkability A, whereby the bottom face portion 12 and the side face portion 11 of the portion 1 are no longer in contact with the concave portion heating/shrinking mold 6. Thus, when the object C is a refrigerated or frozen product, the film is hardened immediately after softening and shrinkage thereof.

Therefore, in the present invention, the characteristic feature of the film for forming the concave container portion 1 is a critical factor, as well as the concave portion heating/shrinking mold 6.

The heating/sealing means 7 to be employed may be conventionally known means, such as a face-seal-type or frame-seal-type heat press plate 7' (not illustrated) or an impulse heater. The heating/sealing means 7 may be means for heating merely a specific portion of the periphery of the concave container portion 1 (e.g., the upper peripheral portion 13), or means for heating both such a specific portion and the cover portion 2.

The heating time during the course of packaging (i.e., the time between initiation of evacuation of air from the space below the film through the bottom-side outlet of the mold and completion of sealing of the film for the top film) is preferably 0.5 to 6.0 seconds, particularly preferably about 1.5 to about 3.0 seconds. The face sealing time (i.e., the time between release of the vacuum of the space below the container material film A and release of the vacuum of the space above the film B for the top film (i.e., the time for maintaining the vacuum of the space above the film B for the top film) is preferably about 0.8 to about 3.0 seconds.

Strictly speaking, the heating temperature of the film A is not the heating temperature of the mold, but the heating temperature of the film A itself. The heating temperature of the film A is 70 to 120° C., preferably 80 to 100° C. When the heating temperature exceeds the above range, the object is heated more than necessary, whereas when the heating temperature is below the above range, formation of wrinkles is insufficient. Particularly when the aforementioned heating time is short, the heating temperature of the film A may differ from that of the mold. However, such a short heating time which causes the difference between these heating temperatures is not necessarily preferred for attaining reliable packaging. Therefore, in general, the film heating temperature can be regarded as being equal to the mold heating temperature.

The temperature for sealing after packaging can be appropriately determined in accordance with the types of resins constituting the films A and B. The set up temperature of the heating means 7 is generally regulated so as to fall within a range of 90 to 150° C., preferably a range of 100 to 130° C. When the set up temperature of the heating means is excessively low, sealing strength tends to become insufficient, whereas when the set up temperature is excessively high, the resin contained in the surface opposite the sealed surface tends to adhere to, for example, a heat press plate.

Film A with Small Shrinkability for a Bottom Portion

The film with small shrinkability A employed in the present invention has a residual heat shrinkage rate at 100° C. of more than 0 and 15% or less (preferably 1 to 10%), and is obtained by stretching a film having deep draw moldability and then thermally relaxing the film, the film having a surface which is formed of a heat sealable material and to become the inner wall of a container.

The expression "film having deep draw moldability" refers to a film which, although being not drawn to corners of a deep drawing mold employed in the below-described test method, can package an irregular-shaped object without causing whitening of the film (preferably, a film which can be drawn so as to accurately reflect the shape of a deep drawing mold and which exhibits excellent appearance).

If desired, the film with small shrinkability A is required to have, for example, heat resistance, pinhole resistance, labelability, and sealability to a top film. In addition, the film with small shrinkability A is required to have gloss, transparency, sealing strength, and ability to prevent removal of a label therefrom. In accordance with the type of an object to be packaged, the film with small shrinkability A may be required to have easy peelability to a top film.

Examples of the film with small shrinkability A employed in the present invention include a film formed of at least two layers including a sealable resin layer (a), and a stretched polyamide resin layer (b) which is formed of a polyamide resin having a melting point higher by about 15° C. or more than the temperature for heating of the film constituting the concave container portion 1 and which has been stretched and then thermally relaxed. In the case of this film, the heating temperature can be selected within a wide temperature range as compared with the case of a conventional PVC skin film, since the polyamide resin constituting the polyamide resin layer (b) has a wide melting point range. However, the heating temperature is preferably 60 to 120° C., more preferably 80 to 110° C., from the viewpoints of the material constituting a layer other than the layer (b) [e.g., the sealable resin layer (a)] and thermal effects on the object C. When the heating temperature is lower than 60° C., shrinkability of the film is lowered, and wrinkles tend to be formed on the surface of the resultant packaged product, whereas when the heating temperature exceeds 120° C., the film is partially melted, which may lead to deterioration of the surface gloss of the film, or breakage of the film. In consideration of the apparatus to be employed, the heating temperature of the film is most preferably about 100° C. In general, the layer structure of the film is determined in accordance with the heating temperature of the film.

The most fundamental form of the film with small shrinkability A containing no chlorine is a two-layer laminate structure formed of the sealable resin layer (a) and the stretched polyamide resin layer (b). However, a functional intermediate layer (d) (e.g., a gas-barrier resin layer) may be provided between the layers (a) and (b). Furthermore, an outer surface layer (c) may be provided in consideration of surface characteristics of the film A (e.g., printability or change in water absorbability of the polyamide resin layer (b)). Optionally, an adhesive resin layer or an additional intermediate layer (e.g., an additional polyamide resin layer) may be provided between the layers (a) and (b).

No particular limitations are imposed on the resin constituting the sealable resin layer (a), so long as the resin provides sealability. Particularly preferred examples of the resin to be employed include polyolefin resins (containing, in an amount of 30% by weight or less, a vinyl comonomer which can be copolymerized with ethylene), such as polypropylene, propylene-ethylene copolymers, linear very low density polyethylene, linear low density polyethylene (these polymers may be formed by use of a Ziegler-Natta catalyst, a metallocene catalyst, a constrained geometry catalyst produced by Dow, or a phenoxyimine complex catalyst), low density polyethylene polymerized by the high-pressure process, ethylene-vinyl acetate copolymers, ionomer resins, ethylene-(meth)acrylic acid copolymers, ethylene-(meth)acrylic acid-unsaturated carboxylic acid (ester) copolymers, and ethylene-ethyl acrylate copolymers. These resins may be employed singly or in combination of two or more species.

Preferably, the resin employed in the sealable resin layer (a) has a melting point equal to or lower than that of the resin constituting the outer surface layer opposite to the layer (a) [i.e., the polyamide resin layer (b) or another outer surface layer (c)]. In the case where the melting point of the resin employed in the sealable resin layer (a) is higher than that of the resin employed in the outer surface layer (b) or (c), when the inner surface of the film is melted during the course of sealing after packaging, the outer surface of the film is also melted, leading to difficulty in sealing.

The sealable resin preferably has a melting point of 150° C. or less (particularly preferably 135° C. or less)

The polyamide resin layer (b) is formed of a stretched polyamide resin having a melting point higher than the temperature for heating the film constituting the concave container portion 1 by about 15° C. or more, preferably 20° C. or more, more preferably 40° C. or more, particularly preferably 60° C. or more. When the polyamide resin layer (b) contains a polyamide resin having a melting point higher than the heating temperature of the film by less than 15° C., the resin layer is melted during the course of packaging, and thus plastic deformation occurs in the layer, and the film tends to exhibit insufficient recovery. As a result, wrinkles tend to be formed after packaging.

Preferred examples of the polyamide resin constituting the polyamide resin layer (b) include aliphatic polyamide polymers such as nylon 6, nylon 66, nylon 69, nylon 610, nylon 612, nylon 11, and nylon 12; and aliphatic polyamide copolymers such as nylon 6-66 (which represents a copolymer of nylon 6 and nylon 66, the same shall apply hereinafter), nylon 6-10, nylon 6-12, nylon 6-69, nylon 6-610, and nylon 66-69. Of these, nylon 6-66 and nylon 6-12 are particularly preferred, from the viewpoint of moldability. These aliphatic polyamide (co)polymers may be employed singly or in combination of two or more species. When these polymers are employed in combination of two or more species, there is a high likelihood that the resultant mixture is affected by a polyamide resin having a lower melting point. Therefore, the amount of the resin that does not satisfy the aforementioned requirement of melting point, which is determined in accordance with the heating temperature of the film, is preferably regulated to less than 30% by weight, particularly preferably less than 20% by weight. The polyamide resin constituting the resin layer may be a mixture predominantly containing such an aliphatic polyamide (co) polymer and containing an aromatic polyamide. As used herein, the term "aromatic polyamide" refers to a polyamide in which at least a portion of at least either of diamine units and dicarboxylic acid units contains an aromatic unit, and the aromatic polyamide is particularly preferably a copolyamide. Examples of the copolyamide include copolymers of an aliphatic nylon and an aromatic polyamide containing an aromatic diamine unit, such as nylon 66-610-MXD6 (MXD6 is the abbreviation of m-xylylene adipamide); and copolymers of an aliphatic polyamide and a copolymerized aromatic polyamide containing an aromatic carboxylic acid unit, such as nylon 66-69-6I (6I is the abbreviation of hexamethylene isophthalamide), nylon 6-6I, nylon 66-6I, and nylon 6I-6T (6T is the abbreviation of hexamethylene terephthalamide).

Preferably, these polyamide resins are employed singly or in combination, so as to attain a melting point of 160 to 210° C. The polyamide resin layer (intermediate layer) (b) may contain, in an amount of up to about 30% by weight, a thermoplastic resin other than a polyamide resin, such as an olefin resin modified with an acid (e.g., maleic acid) or an anhydride thereof, an ethylene-acrylic acid copolymer, an ethylene-methacrylic acid copolymer, an ionomer resin, or a saponified ethylene-vinyl acetate copolymer.

The polyamide resin layer (b) must be stretched in at least one direction (preferably in two (machine and transverse) directions). The entirety of the laminate film may be subjected to stretching.

The outer surface layer (c), which is employed if desired (but, in many cases, use of the layer (c) is preferred), is formed of a thermoplastic resin which has a melting point higher than the sealing temperature of the film by about 5° C. or more, and which potentially exhibits hygroscopicity lower than that of a polyamide resin. In the case where a thermoplastic resin having a melting point higher than the sealing temperature of the film by less than 5° C. is employed, when the film is brought into contact with a heating plate (mold) during the course of packaging, stains tend to occur on the surface of the film, resulting in deterioration of the gloss of the film after packaging, which may lead to poor appearance of the resultant packaged product. When a thermoplastic resin exhibiting hygroscopicity equal to or higher than that of a polyamide resin is employed, in some cases, the outer surface layer (c) adversely affects the polyamide resin layer (intermediate layer).

Preferred examples of the thermoplastic resin constituting the outer surface layer (c) are as follows.

Preferred examples include polyolefin resins such as polypropylene, propylene-ethylene copolymers, linear low density polyethylene, linear very low density polyethylene, medium density polyethylene, and high density polyethylene. These resins may be employed singly or in combination of two or more species. The outer surface layer (c) may contain, in an amount of 30% by weight or less (preferably 20% by weight or less), an additional resin, such as an olefin copolymer wherein the amount of a comonomer other than olefin is less than 50% by weight (e.g., an ethylene-vinyl acetate copolymer, an ionomer resin, or an ethylene-(meth) acrylic acid copolymer) or a propylene-ethylene copolymer having a melting point that does not satisfy the aforementioned requirement, so long as the additional resin does not considerably impair the heat resistance of the layer (c).

In some cases, the outer surface layer (c) may contain a polyamide resin selected from the aforementioned polyamide resins which may be employed in the polyamide resin layer (b).

Other preferred examples of the resin constituting the outer surface layer (c) include aliphatic and/or aromatic polyester resins. The dicarboxylic acid component constituting such a polyester resin may be any dicarboxylic acid, so long as a polyester can be produced from the dicarboxylic acid by means of a generally employed production process. Examples of the dicarboxylic acid which may be employed include, in addition to terephthalic acid and isophthalic acid, which are described above, dimeric acids formed of dimers of unsaturated fatty acids, adipic acid, oxalic acid, malonic acid, succinic acid, azelaic acid, sebacic acid, phthalic acid, 5-t-butylisophthalic acid, naphthalenedicarboxylic acid, diphenyl ether dicarboxylic acid, and cyclohexanedicarboxylic acid. These dicarboxylic acids may be employed in combination of two or more species. The diol component constituting such a polyester resin may be any diol, so long as a polyester can be produced from the diol by means of a generally employed production process. Examples of the diol which may be employed include ethylene glycol, propylene glycol, tetramethylene glycol, neopentyl glycol, hexamethylene glycol, diethylene glycol, polyalkylene glycol, 1,4-cyclohexanedimethanol, and 2-alkyl-1,3-propanediol. These diols may be employed in combination of two or more species. Of these polyester resins, an aromatic polyester resin containing an aromatic dicarboxylic acid component is preferred, with a polyester resin formed of terephthalic acid (dicarboxylic acid component) and a diol having 10 or less carbon atoms (e.g., polyethylene terephthalate or polybutylene terephthalate) being particularly preferred. Also, there is preferably employed a copolymerized polyester resin in which a portion of terephthalic acid units (preferably up to 30% by mol, more preferably up to 15% by mol) is substituted by another dicarboxylic acid (e.g., isophthalic acid), or a copolymerized polyester resin in which a portion of diol (e.g., ethylene glycol) units is substituted by another diol (e.g., 1,4-cyclohexanedimethanol). Two or more different polyester resin species may be employed in combination.

The polyester resin to be employed preferably has an intrinsic viscosity of about 0.6 to about 1.2. The polyester resin constituting the outer surface layer (c) may contain, in an amount of up to 20% by weight, a thermoplastic resin other than a polyester resin; for example, a thermoplastic elastomer such as thermoplastic polyurethane, or a polyolefin resin modified with an acid (e.g., maleic acid) or an anhydride thereof.

Examples of the resin constituting the functional intermediate layer (d) (which is provided if desired) include a resin containing no chlorine and exhibiting (oxygen) gas-barrier property. Specific examples of such a resin include saponified ethylene-vinyl acetate copolymers (EVOH), nylon MXD6, and nylon 6I-6T, which are known materials. Of these, EVOH is preferably employed, from the viewpoint of its excellent moldability.

Examples of the resin constituting the additional intermediate layer include copolymers of ethylene and one or more monomers containing oxygen in the molecule. Specific examples include EVA, EMAA, ethylene-methacrylic acid-unsaturated carboxylic acid copolymers, EMA, EAA, IO resin, and polyethylene formed by use of a metallocene catalyst.

The adhesive resin layer may be provided as an intermediate layer if desired; for example, in the case where sufficient adhesion is not attained between the aforementioned respective layers. Preferred examples of the adhesive resin which may be employed include EEA, EAA, EMAA, IO, and acid-modified polyolefins (including products obtained through reaction of an olefin homopolymer or copolymer with an unsaturated carboxylic acid (e.g., maleic acid or fumaric acid), an unsaturated carboxylic acid anhydride, an unsaturated carboxylic acid ester, or an unsaturated carboxylic acid metal salt; for example, acid-modified VLDPE, acid-modified LLDPE, acid-modified EEA, acid-modified EVA, acid-modified PP, and acid-modified PP-Et). Suitable examples include acid-modified polyolefins obtained through modification with an acid (e.g., maleic acid) or an anhydride thereof.

Any of the above-described layers may contain a lubricant or an antistatic agent.

Examples of the lubricant to be employed include hydrocarbon lubricants, fatty acid lubricants, aliphatic amide lubricants, ester lubricants, and metallic soaps. The lubricant may be in the form of liquid or solid. Specific examples of the hydrocarbon lubricants include liquid paraffin, natural paraffin, polyethylene wax, and microcrystalline wax. Examples of the fatty acid lubricants include stearic acid and lauric acid. Examples of the aliphatic amide lubricants include stearic acid amide, palmitic acid amide, N-oleyl-palmitic acid amide, behenic acid amide, erucic acid amide, arachidic acid amide, oleic acid amide, erucic acid amide, methylenebisstearamide, and ethylenebisstearamide. Examples of the ester lubricants include butyl stearate, hydrogenated castor oil, ethylene glycol monostearate, and stearic acid monoglyceride. Examples of the metallic soaps include metallic soaps derived from $C_{12}$ to $C_{30}$ fatty acids, such as zinc stearate and calcium stearate. Of these lubricants, aliphatic amide lubricants and metallic soaps are preferably employed, from the viewpoint of excellent compatibility with a polyolefin resin.

A known inorganic lubricant (anti-blocking agent) such as silica or zeolite may be added to both the outer layers.

A lubricant such as an aliphatic amide or silica may be added in the form of a masterbatch. In the case of a masterbatch containing such a lubricant in an amount of 20% by weight, the preferred amount of the masterbatch to be added is 0.1 to 10% by weight.

The antistatic agent to be employed is preferably a surfactant. Examples of the surfactant which may be employed include anionic surfactants, cationic surfactants, nonionic surfactants, amphoteric surfactants, and mixtures thereof. The amount of the antistatic agent is preferably 0.05 to 2% by weight, more preferably 0.1 to 1% by weight, on the basis of the entirety of the resin constituting the layer to which the antistatic agent is to be added.

Preferred examples of the layer structure of the film A will next be described, but the present invention is not limited to these examples.

The following examples are represented according to the order of arrangement of the layers constituting the film (from the outer surface layer toward the inner surface layer).

(1) Polypropylene resin layer/polyamide resin layer/sealable resin layer (2) Polypropylene resin layer/polyamide resin layer/non-chlorine-containing gas-barrier resin layer/sealable resin layer (3) Polypropylene resin layer/polyamide resin layer/non-chlorine-containing gas-barrier resin layer/polyamide resin layer/sealable resin layer (4) Polyester resin layer/polyamide resin layer/sealable resin layer (5) Polyester resin layer/polyamide resin layer/non-chlorine-containing gas-barrier resin layer/sealable resin layer (6) Polyamide resin layer/EVOH layer/sealable resin layer (7) Polyamide resin layer/EVOH layer/polyamide resin layer/sealable resin layer In the case where layers of the aforementioned layer structure exhibit poor adhesion, an adhesive layer may be appropriately provided between the layers.

The film A may have any of the following layer structures.

(1') Polyester resin or polyolefin resin layer/adhesive resin layer/polyamide resin layer/adhesive resin layer/sealable resin layer (2') Polyester resin or polyolefin resin layer/adhesive resin layer/polyamide resin layer/gas-barrier resin layer/sealable resin layer (3') Polyester resin or polyolefin resin layer/adhesive resin layer/polyamide resin layer/adhesive resin layer/gas-barrier resin layer/adhesive resin layer/sealable resin layer (4') Polyester resin or polyolefin resin layer/adhesive resin layer/polyamide resin layer/adhesive resin layer/gas-barrier resin layer/adhesive resin layer/polyamide resin layer/adhesive resin layer/sealable resin layer (5') Polyester resin or polyolefin resin layer/adhesive resin layer/polyamide resin layer/gas-barrier resin layer/polyamide resin layer/adhesive resin layer/sealable resin layer Preferably, the film A (i.e., multi-layer film) is formed by laminating the aforementioned layers, followed by stretching and relaxation, so as to attain a final thickness of 20 to 150 μm, particularly preferably 40 to 120 μm.

More specifically, the thickness of the outer surface layer (c) is preferably regulated to 0.5 to 25 μm, particularly preferably 1 to 15 μm; the thickness of the polyamide resin layer (b) is preferably regulated to 3 to 40 μm, particularly preferably 5 to 30 μm; and the thickness of the sealable resin layer (a) is preferably regulated to 10 to 70 μm, particularly preferably to 15 to 60 μm.

Particularly when the outer surface layer is formed of a polyester resin, in order to match the biaxial stretchability of the outer surface layer with that of the layer (b), the thickness of the outer surface layer is regulated to 3 to 70% (preferably 6 to 50%) that of the layer (b).

The thickness of the gas-barrier resin layer is 1 to 30 μm, preferably 2 to 20 μm.

A plurality of adhesive resin layers may be provided, and the thickness of each of the layers is preferably 0.5 to 5 μm.

The film A may be produced through co-stretching of co-extruded layers constituting a non-stretched multi-layer film by means of a known process, such as an inflation process or tenter process. Alternatively, the film A may be produced by laminating a stretched film containing a polyamide resin layer (b) with a non-stretched film, or laminating stretched films together through a known lamination process, so as to form a desired layer structure.

The film with small shrinkability A is produced through, for example, the following procedure.

Resin species of layers constituting a multi-layer film are co-extruded, via a circular die, from extruders whose number corresponds to the number of the resin species, to thereby yield a tubular film (parison) including an outer surface layer (c) formed of a thermoplastic resin, an intermediate layer (b) formed of a polyamide resin, and an inner surface layer (a) formed of a sealable resin. The resultant tubular film is taken up by use of pinch rollers, while the tubular film is cooled, by use of a water bath or the like, to a temperature that is equal to or lower than the lowest one of the melting points of the primary resins constituting the respective layers (preferably cooled to 40° C. or lower). Subsequently, while the thus-taken-up tubular film is filled with an unsealing agent such as soybean oil (this operation is performed if desired), the tubular film is brought into a hot water bath having a temperature that is equal to or lower than the lowest one of the melting points of the primary resins constituting the respective layers (e.g., a hot water bath of 80 to 95° C.). The thus-heated tubular film is pulled upward to form a bubble-like tubular film by means of air fed between a pair of pinch rollers. While the resultant tubular film is cooled by cooling air of 10 to 20° C., the film is biaxially stretched in a machine direction (MD) and in a transverse direction with extension ratio of preferably 2.5 to 4 times, more preferably 2.8 to 3.5 times. Most preferably, the film is biaxially stretched in a machine direction with extension ratio of 2.9 to 3.5 times and in a transverse direction with extension ratio of 3 to 3.5. Subsequently, the thus-stretched tubular film is pulled downward to again form a bubble-like tubular film by means of air fed between a pair of pinch rollers, and the thus-formed tubular film is held in a heat treatment tube. Steam (or hot water) is sprayed, through a blowing port of the heat treatment tube, to the tubular film, whereby the film is subjected to thermal treatment at 70 to 98° C. (preferably 75 to 95° C.) for 1 to 20 seconds (preferably 1.5 to 10 seconds). While the tubular film is subjected to thermal treatment, the film is relaxed in a machine direction (MD) and in a transverse direction (TD) by 10 to 40% (by 20% or more in at least one of these directions), preferably by 20 to 30% in each of the directions. The thermally treated tubular film, which corresponds to the film employed in the present invention, is wound around a take-up roller.

In order to maintain its excellent strength and to improve its characteristics, preferably, the film with small shrinkability A is stretched in a machine direction (MD) and in a transverse direction (TD) with extension ratio of 2.5 to 4 times, more preferably 2.8 to 3.5 times (most preferably, the film is stretched in the MD with extension of 2.9 to 3.5 times and in the TD with extension ratio of 3 to 3.5 times), and the film is subjected to thermal treatment by use of steam or hot water, which has high heat capacity, at a low temperature of 70° C. to 98° C. (preferably 75° C. to 95° C., most preferably 80° C. to 95° C.) while the film is relaxed in a machine direction and in a transverse direction by 15% to 40% (by 20% or more in one of these directions), preferably by 20% to 30% in each of the directions. When the stretch magnification is lower than the aforementioned range, the thermally treated film fails to exhibit a necessary level of strength, and variation in the film thickness increases, and thus the film tends not to exhibit packaging performance. When a medium of low heat capacity (e.g., heated air) is employed, or thermal treatment is performed at a temperature lower than 70° C., difficulty is encountered in increasing the percent relaxation of the film, whereas when thermal treatment is performed at a temperature higher than 100° C., the polyolefin resin constituting the sealable layer tends to melt, resulting in degradation of the crystal orientation of the polyolefin layer, and the film tends not to exhibit excellent strength.

When the percent relaxation during thermal treatment is less than 15%, sufficient orientation relaxation fails to be attained at a target amorphous portion of the film, and the film exhibits poor moldability, whereas when the percent relaxation during thermal treatment exceeds 40%, the tensile force of the film cannot be regulated, and wrinkles tend to be formed during the course of molding of the film.

The thus-formed multi-layer film maintains its fundamental strength (e.g., tensile strength) at a high level as a result of high-level stretching of the polyamide resin layer, and exhibits lowered heat shrinkability as a result of high-temperature thermal relaxation performed subsequent to the stretching. Therefore, the sealed portion is not curled more than necessary, and the resultant packaged product exhibits good appearance. In addition, the deep-drawn portion is thermally shrunk in an efficient manner, and thus, for example, formation of wrinkles on the packaged product can be prevented; i.e., the packaged product exhibits improved appearance.

The residual heat shrinkage rate (100° C., dry heat) of the film for deep draw packaging is preferably more than 0 and 15% or less, more preferably 1 to 10%. The residual heat shrinkage rate of the stretch-oriented multi-layer film can be maintained at a necessary level by regulating the percent relaxation of the film in accordance with the stretch-orientation magnification of the film (the percent relaxation is regulated to 20% or more in at least one of the aforementioned directions).

In the packaging method of the present invention, no particular limitations are imposed on the size of the concave container portion 1 before packaging. The packaging method can employ a concave container portion 1 having a depth of 50 mm or more for the production of a deep draw packaged product.

Film B for Top Film

The film B for a top film is a film which can adhere to the film with small shrinkability A (preferably a film which can be heat welded to the film A). The film B may be a non-shrinkable film, a film with small shrinkability, or a shrinkable film.

The film B may be the film with small shrinkability A, or a non-shrinkable or shrinkable film formed of the same material as the film A. Alternatively, the film B may be formed of, for example, a material which, although having no deep drawability, exhibits gas-barrier property, a material which does not cause curling of the film B or a packaged product, or a material having a supporting function.

Specific examples of the film B include films described below in Comparative Examples.

The object C employed in the present invention is smaller in size than the concave container portion, and may differ in shape from the concave container portion. Particularly, the object C may be much smaller in size than a mold, and may differ in shape from the mold. Specific examples of the object C include processed meat products such as sliced bacon, sausage, ham, roast pork, hamburger, and meat; processed dairy products such as cheese; fish-based paste products such as kamaboko (fish sausage) and kanimodoki (artificial crab meat); vegetable processed products such as processed noodle, konnyaku (yam cake), ganmodoki (tofu fritter), and aburaage (fried tofu pouch); processed foods such as powdery foods and liquid foods; non-food products such as mechanical parts and electronic parts; and regular or irregular forms of these products. Examples of the object C also include processed meat products which are subjected to boiling after packaging for the purpose of, for example, surface sterilization; and fish-based paste products which are distributed in a frozen state.

In the deep draw packaging method of the present invention, an object (e.g., the aforementioned processed food) is placed in a concave container portion formed of the film with small shrinkability A; a top film is placed on the container portion; the resultant product is transferred to a specific vacuum packaging apparatus; side face and bottom face portions of the concave container portion are thermally shrunk, so as to bring the container portion into close contact with the object without formation of wrinkles on the portion or vacant gaps between the portion and the object; and the container portion is thermally sealed with the top film. A packaged product produced through the method has few curled portions.

EXAMPLES

The present invention will next be described in more detail by way of Examples, which should not be construed as limiting the invention thereto.

The method for measuring physical property described herein is as follows.

<Physical Property Measurement Method>

Measurement Method for Heat Shrinkage Rate

A 3 mm-thick corrugated paper sheet is placed on a net rack of a Geer oven (model: MOG-600, a product of Robert CO. Ltd.), and the oven is heated to a predetermined temperature. A film sample on which marks have been provided at an interval (distance) of 10 cm in a machine direction (longitudinal direction, MD) or in a direction (transverse direction, TD) perpendicular to the machine direction of the sample is placed in the heated oven. In this case, the door of the oven is closed immediately after the sample is placed therein so that the door opening period is restricted to three seconds or less. After the oven door is closed and the sample is allowed to stand in the oven for 30 seconds, the sample is removed from the oven and then left to cool. Thereafter, the distance between the marks is measured, and the ratio of a decrease in distance to the original distance (10 cm) is represented in percentage (%). Five samples from each film are subjected to the above measurement, and the average percent decrease in distance in the MD or TD of the film is determined, whereby the residual thermal shrinkage rate is obtained.

[Film Production]

Production of films employed in Examples and Comparative Examples will next be described. Resins employed for producing films are shown in Table 1 together with abbreviations of the resins.

TABLE 1

| Abbreviation | Resin |
|---|---|
| Ny | Nylon 6-66 copolymer (copolymerization ratio: 80% by weight:20% by weight) |
| PET | Polyethylene terephthalate-polyethylene isophthalate copolymer (copolymerization ratio: 88% by weight:12% by weight) |
| Mod-VL | Very low density polyethylene modified with unsaturated carboxylic acid (resin of adhesive layer for co-extrusion) |
| EVOH | Saponified ethylene-vinyl acetate copolymer (ethylene content: 48% by mol) |
| LLDPE | Linear low density polyethylene (ethylene-octene copolymer) (density: 0.916 g/cm$^3$) |

[Production of Bottom Film (1)]

In an inflation apparatus, the aforementioned respective resins were extruded from a plurality of extruders, so as to attain the layer structure (as shown in Table 2) of PET (3)/Mod-VL (2)/Ny (13)/EVOH (4)/Mod-VL (2)/LLDPE (31) (which are arranged from the outer side toward the inner side, and have thicknesses shown in parentheses (unit: μm)). The thus-melted resins were brought into a circular die, and melt-bonded and co-extruded to form the aforementioned layer structure.

The molten tubular product extruded through the outlet of the die was quenched to 10 to 18° C. in a water bath, to thereby form a flat tubular product. Subsequently, the flat tubular product was caused to pass through a hot water bath of 92° C., and then formed into a bubble-like tubular film. The resultant tubular film was biaxially stretched, by means of an inflation process, in a machine direction (MD) with extension ratio of 3.4 times and in a transverse direction (TD) with extension ratio of 3.4 times, while the film was cooled with cooing air at 15 to 20° C. Subsequently, the biaxially stretched film was brought into a thermal treatment tube having a length of 2 m, and the film was formed into a bubble-like tubular film. The tubular film was thermally treated for two seconds at 90° C. with steam fed through a blowing port of the tube, while the film was relaxed in a machine direction by 20% and in a transverse direction by 20%, to thereby produce a biaxially stretched film (a stretch-oriented multi-layer film). The thus-produced multi-layer film was found to have a lay-flat width of 490 mm and a thickness of 55 μm.

[Production of Bottom Films (2) and (3)]

The procedure for production of the film (1) was repeated, except that the layer structure, film thickness, and film formation (stretching-relaxation) conditions were changed as shown in Table 2, to thereby produce a multi-layer film.

[Production of Bottom Film (4)]

The respective resins were extruded from a plurality of extruders, so as to attain the layer structure as shown in Table 2. The thus-melted resins were brought into a T die, and melt-bonded and co-extruded to form the aforementioned layer structure, whereby a co-extruded, non-stretched multi-layer film having a thickness of 110 μm was produced.

[Production of Top Film Film (5)]

The non-stretched, co-extruded film of Comparative Example 1 and a biaxially stretched polypropylene film (Kohjin Polyset, product of Kohjin Co., Ltd., thickness: 30 μm, hereinafter abbreviated as "OPP") were subjected to dry lamination, to thereby produce a film (thickness: 130 μm) having a structure of OPP/co-extruded film. The thus-produced film was employed as a top film.

TABLE 2

| | Film (1) | | Film (2) | | Film (3) | | Film (4) | |
|---|---|---|---|---|---|---|---|---|
| | Material | Thickness (μm) | Material | Thickness (μm) | Material | Thickness (μm) | Material | Thickness (μm) |
| Container material film structure | | | | | | | | |
| First layer | PET | 3 | PET | 3 | — | | PET | 20 |
| Second layer | Mod-VL | 2 | Mod-VL | 2 | — | | Mod-VL | 5 |
| Third layer | Ny | 13 | Ny | 13 | Ny | 23 | Ny | 5 |

TABLE 2-continued

| | Film (1) | | Film (2) | | Film (3) | | Film (4) | |
|---|---|---|---|---|---|---|---|---|
| | Material | Thickness (μm) | Material | Thickness (μm) | Material | Thickness (μm) | Material | Thickness (μm) |
| Fourth layer | EVOH | 4 | EVOH | 4 | EVOH | 4 | EVOH | 10 |
| Fifth layer | Mod-VL | 2 | Mod-VL | 2 | Mod-VL | 2 | Mod-VL | 5 |
| Sixth layer | LLDPE | 31 | LLDPE | 31 | LLDPE | 31 | LLDPE | 65 |
| Total thickness | | 55 | | 55 | | 60 | | 110 |
| Stretch magnification | | | | | | | | |
| MD | | 3.4 | | 3.0 | | 3.0 | | Non-stretched |
| TD | | 3.4 | | 3.0 | | 3.0 | | Non-stretched |
| Thermal treatment conditions | | | | | | | | |
| Temperature (° C.) | | 90 | | 90 | | 90 | | — |
| Relaxation (%) MD | | 25 | | 30 | | 20 | | — |
| TD | | 25 | | 30 | | 20 | | — |
| Physical properties of film | | | | | | | | |
| Thermal shrinkage rate (%) at 100° C. | | | | | | | | |
| MD | | 5 | | 2 | | 6 | | 0 |
| TD | | 4 | | 1 | | 4 | | 0 |

<Performance Evaluation Test>

Applicability of Container Material to Deep Drawing

A vacuum box of a deep draw packaging machine (FV-603, product of Omori Machinery Co., Ltd.) was modified such that cooling water is fed through a concave portion forming mold for preventing the temperature of the mold from rising more than necessary, so as to prevent adhesion of a film to the surface of the mold when the film is heated by an upper heating plate 8. A concave container portion was molded at a temperature of 90 to 100° C. by use of a deep draw forming mold having an elliptic cross section (major axis length: 120 mm, minor axis length: 90 mm, depth: 30 mm).

A ham product having a diameter of 50 mm and a height of 25 mm, which are smaller than those of the molded container, was employed as an object C.

There was employed a vacuum packaging apparatus 5 including a concave portion heating/shrinking mold 6 having the same shape as the mold for forming a concave container portion 1, and a heater 6' which is provided on the inner bottom of the mold 6 as shown in FIG. 3A and which can regulate the temperature of the surface of the mold 6 to a predetermined temperature.

Molding of the concave container portion 1 was carried out under each of the following three conditions: no heating of the film (i.e., conventional process), heating of the film at 90° C., and heating of the film at 100° C. In the case of no heating of the film, the temperature of the mold is controlled to about 40° C. by use of cooling water.

Each of the multi-layer films produced in Examples and Comparative Examples was subjected to the above-described physical property measurement and performance evaluation test. The results are shown in the below-described Table 3.

<Evaluation Criteria>

(1) Moldability

A: molding can be performed so as to precisely reflect the shape of the mold.

C: deep draw molding cannot be performed.

(2) Wrinkle (the Top Surface, Side Surface, and Peripheral Sealed Portion of a Container Containing an Object)

A: no wrinkles are formed on the entire surface of the container, and the container has good appearance.

C: no wrinkles are formed on the top surface of the container, but short wrinkles, which cause less appearance problems but cause generation of pinholes, remain on a region from the side surface to the sealed portion, or on a portion of the sealed portion.

D: deep wrinkles are formed on the entirety of the sealed portion; i.e., the container exhibits poor appearance.

(3) Curl

A: the sealed portion of a packaged product is less curled; i.e., the packaged product has no problems in terms of appearance.

C: the sealed portion of a packaged product is curled; i.e., the packaged product has an appearance so that the commercial value thereof is reduced.

TABLE 3

| | Examples | | | | Comparative Examples | | |
|---|---|---|---|---|---|---|---|
| | 1 | 2 | 3 | 4 | 1 | 2 | 3 |
| Container material | Film (1) | Film (1) | Film (2) | Film (3) | Film (4) | Film (1) | Film (4) |
| Top film | | | | | Film (5) | | |
| Molding temperature (° C.) | 100 | 100 | 100 | 100 | 90 | 100 | 90 |

TABLE 3-continued

|  | Examples | | | | Comparative Examples | | |
| --- | --- | --- | --- | --- | --- | --- | --- |
|  | 1 | 2 | 3 | 4 | 1 | 2 | 3 |
| Mold temperature (° C.) (as measured at bottom) | 100 | 80 | 100 | 100 | 100 | Ambient temp. | Ambient temp. |
| Moldability | A | A | A | A | A | A | A |
| Wrinkle | A | A | A | A | C | C | D |
| Curl | A | A | A | A | A | A | A |

INDUSTRIAL APPLICABILITY

The packaging method of the present invention employs a specific film with small shrinkability which has undergone stretching and exhibits deep draw moldability, and therefore, a concave portion can be formed through deep draw molding at a conventional temperature without causing excessive reduction of the thickness of a portion that rises from the bottom of the concave portion; i.e., the concave portion can be formed without causing heat shrinkage by remaining heat, which shrinkage would occur immediately after deep drawing. Since the packaging method of the present invention employs a specific packaging apparatus which can heat the concave portion, when an object is placed in the concave portion, and then the portion is sealed with a film for a top film, to thereby produce a packaged product, the concave portion comes into close contact with the object because of residual shrinkability intrinsic to the film with small shrinkability and thermal shrinkability of the film as a result of stretching through deep draw molding, and thus generation of wrinkles, vacant gaps, or pinholes is considerably suppressed as compared with the case of a conventional packaging method. Therefore, the packaging method of the present invention does not require a boiling step for smoothing wrinkle. In addition, the packaging method does not cause excessive pressing of the contents of a packaged product, which may lead to excessive deformation of the packaged product, or oozing of liquid (e.g., meat juice) from the product.

The invention claimed is:

1. A deep draw packaging method comprising:
placing an object (C) in a concave container portion (1) formed through molding of a film with small shrinkability (A) having a residual heat shrinkage rate at 100° C. of 1 to 15%, the film (A) being formed by stretching a film having deep draw moldability at 80 to 95° C. with an extension ratio of 2.5 to 4.0 times in a machine direction (MD) and with an extension ratio of 2.5 to 4.0 times in a transverse direction (TD), and then shrinking the film at 70 to 98° C. by 10 to 40% in the MD and by 10 to 40% in the TD, the film having a surface which is formed of a heat sealable material becomes an inner wall of the container portion;
transferring the concave container portion (1) to a vacuum packaging apparatus (5);
placing, on the concave container portion (1), a cover portion (2) formed of a film (B) which can be heat welded to the film with small shrinkability (A);
thermally shrinking a side face portion (11) and a bottom face portion (12) of the concave container portion (1) by use of a concave portion heating/shrinking mold (6) such that the side face portion (11) and the bottom face portion (12) come into close contact with the object (C); and
sealing an upper peripheral portion (13) of the concave container portion (1) with the film (B) through heating/sealing means (7).

2. A deep draw packaging method according to claim 1, wherein the film with small shrinkability (A) has a residual heat shrinkage rate at 100° C. of 1 to 10%.

3. A deep draw packaging method according to claim 2, wherein the film with small shrinkability (A) includes a sealable resin layer (a); a polyamide resin layer (b) which is formed of a polyamide resin having a melting point higher by about 15° C. than the temperature for heating the film constituting the concave container portion (1) and which has been stretched and then thermally relaxed; and, if desired, a surface layer (c) formed of a thermoplastic resin.

4. A deep draw packaging method according to claim 1, wherein the film with small shrinkability (A) includes a sealable resin layer (a); a polyamide resin layer (b) which is formed of a polyamide resin having a melting point higher by about 15° C. than the temperature for heating the film constituting the concave container portion (1) and which has been stretched and then thermally relaxed; and, if desired, a surface layer (c) formed of a thermoplastic resin.

5. A deep draw packaging method according to claim 1, wherein the object (C) is a processed food.

6. A deep draw packaging method according to claim 5, wherein the film (B) comprises the same film as the film with small shrinkability (A).

7. A deep draw packaging method according to claim 5, wherein the vacuum packaging apparatus (5) can heat the side face portion (11) and the bottom face portion (12) of the transferred concave container portion (1) to 70 to 120° C., and can evacuate the space between the concave container portion (1) containing the object (C) and the cover portion (2) formed of the film (B).

8. A deep draw packaging method according to claim 7, wherein the vacuum packaging apparatus (5) has a structure such that the concave portion heating/shrinking mold (6) comes into close contact with the side face portion (11) and the bottom face portion (12) of the concave container portion (1) after initiation of evacuation.

9. A deep draw packaging method according to claim 1, wherein the film (B) comprises the same film as is the film with small shrinkability (A).

10. A deep draw packaging method according to claim 1, wherein the vacuum packaging apparatus (5) can heat the side portion (11) and the bottom portion (12) of the transferred concave container portion (1) to 70 to 120° C., and can evacuate the space between the concave container portion (1) containing the object (C) and the cover portion (2) formed of the film (B).

11. A deep draw packaging method according to claim 10, wherein the vacuum packaging apparatus (5) has a structure such that the concave portion heating/shrinking mold (6) comes into close contact with the side face portion (11) and the bottom face portion (12) of the concave container portion (1) after initiation of evacuation.

* * * * *

UNITED STATES PATENT AND TRADEMARK OFFICE
CERTIFICATE OF CORRECTION

PATENT NO.         : 7,237,371 B2                                    Page 1 of 1
APPLICATION NO.    : 10/529236
DATED              : July 3, 2007
INVENTOR(S)        : Yamamoto et al.

It is certified that error appears in the above-identified patent and that said Letters Patent is hereby corrected as shown below:

Title Page, left column,

Delete Assignee and replace with the following:

[73] Assignee:     KUREHA CORPORATION, Tokyo (JP)

Signed and Sealed this

Eleventh Day of December, 2007

JON W. DUDAS
*Director of the United States Patent and Trademark Office*